United States Patent [19]

Ogura et al.

[11] 4,143,964
[45] Mar. 13, 1979

[54] SCANNING LIGHT SOURCE

[75] Inventors: Yukio Ogura; Hisao Ishii, both of Tokyo, Japan

[73] Assignee: Ricoh Company, Ltd., Tokyo, Japan

[21] Appl. No.: 775,026

[22] Filed: Mar. 7, 1977

[30] Foreign Application Priority Data

Mar. 9, 1976 [JP] Japan .............................. 51-27736[U]

[51] Int. Cl.² ............................................ G03B 27/52
[52] U.S. Cl. ..................................... 355/30; 352/202; 355/67; 362/6
[58] Field of Search .................. 355/30, 8, 51, 65, 66, 355/, 67; 352/202; 240/9 A; 362/6, 218, 294, 345, 373

[56] References Cited

U.S. PATENT DOCUMENTS

| 3,302,519 | 2/1967 | Young | 355/30 |
| 3,532,424 | 10/1970 | Miles | 355/30 |
| 3,626,176 | 12/1971 | Tsugami | 352/202 X |
| 3,762,814 | 10/1973 | Kitch | 355/30 |
| 3,936,176 | 2/1976 | Whited | 355/30 X |

Primary Examiner—Richard A. Wintercorn
Attorney, Agent, or Firm—Frank J. Jordan

[57] ABSTRACT

A curved reflector is disposed behind an elongated lamp for reflecting light from the lamp onto a document carrier in the form of a narrow elongated beam. The carrier is movable perpendicular to the beam for scanning a document placed on the carrier. One or more orifices are formed through the back of the reflector and a blower creates an air flow through the orifice and around the lamp for cooling the same.

9 Claims, 4 Drawing Figures

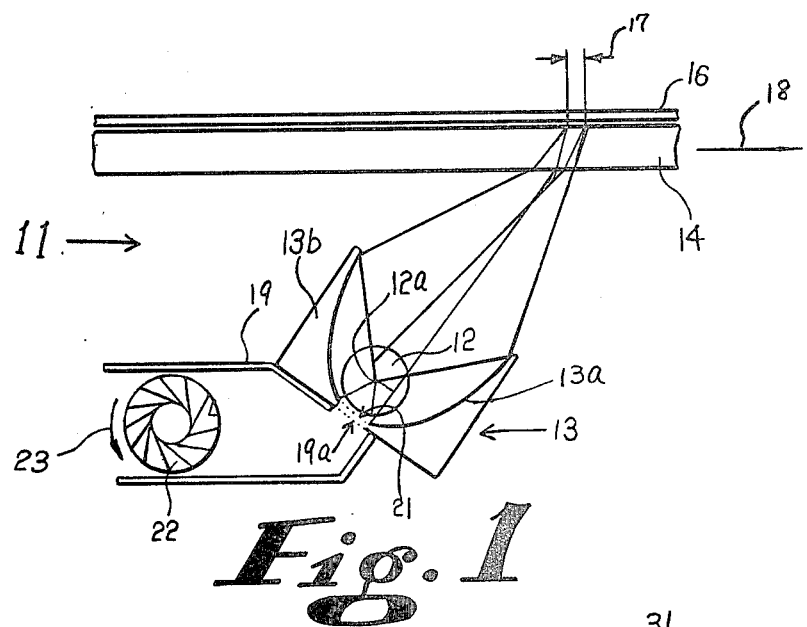
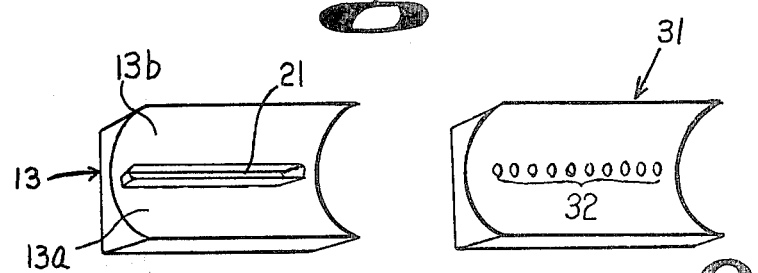
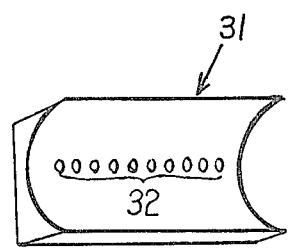
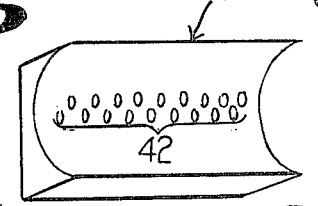

SCANNING LIGHT SOURCE

BACKGROUND OF THE INVENTION

The present invention relates to a scanning light source especially suited for incorporation in an exposure system of an electrostatic copying machine.

In a typical copying machine, an original document which is to be reproduced is placed face down on a transparent document carrier or platen. A light source comprising an elongated lamp and a reflector is disposed below the platen and radiates a narrow elongated beam of light onto the document. The carrier and document are moved perpendicular to the beam so that the document is progressively illuminated, for example, from top to bottom. An optical system focusses an image of the illuminated portion of the document onto a drum provided with a surface layer of a photoconductive material such as selenium or zinc oxide, the surface speed of the drum being equal to the surface speed of the document. As a result, an electrostatic image of the document is formed on the drum which is developed and transferred to a copy sheet to provide a permanent reproduction of the document.

In order to provide sufficient light intensity to properly expose the photoconductive drum, the lamp must be quite powerful, and unavoidably generate a substantial amount of heat. In a system in which the lamp and reflector are moved while the document is maintained motionless, the lamp is cooled through convection as a consequence of movement through the air. However, in the present system in which the document is moved while the lamp and reflector remain motionless, the lamp may generate enough heat to damage various parts of the copying machine or even start a fire if subjected to prolonged continuous operation. In addition, the life of the lamp is reduced considerably by the excessive heat.

It is known in the prior art to cool the lamp by means of a blower. However, a design choice has heretofore had to be made as to whether to provide a simplified arrangement in which the blower partially obstructs the light beam or a complicated and expensive arrangement including various ducts which avoids obstruction of the light beam.

SUMMARY OF THE INVENTION

The present invention eliminates the unfortunate design choice described hereinabove by providing a unique and improved light source in which the lamp is cooled by a blower which does not obstruct the light beam. The light source furthermore does not require a complicated duct system. In summary, the present light source comprises a curved reflector which is disposed behind an elongated lamp for reflecting light from the lamp onto a document carrier in the form of a narrow elongated beam. The carrier is moved perpendicular to the beam for scanning a document placed on the carrier. One or more orifices are formed through the back of the reflector and a blower creates an air flow through the orifice and around the lamp for cooling the same. The orifices are formed in a section of the reflector which does not contribute to the illumination of the document. In other words, light is reflected from this section back to the lamp rather than to the document. In one form of the invention the blower causes the air to flow through the orifice to the lamp. In another aspect of the invention the blower causes the air to flow from the area of the lamp to the orifice.

It is an object of the present invention to provide a scanning light source for an electrostatic copying machine or the like comprising a unique arrangement for cooling a lamp.

It is another object of the present invention to provide a generally improved scanning light source.

Other objects, together with the foregoing, are attained in the embodiments described in the following description and illustrated in the accompanying drawing.

BRIEF DESCRIPTION OF THE DRAWING

FIG. 1 is a schematic view of a scanning light source embodying the present invention;

FIG. 2 is a perspective view showing a first embodiment of a reflector of the light source;

FIG. 3 is similar to FIG. 2 but shows a second embodiment of the reflector; and

FIG. 4 is also similar to FIG. 2 but shows a third embodiment of the reflector.

DESCRIPTION OF THE PREFERRED EMBODIMENTS

While the scanning light source of the invention is susceptible of numerous physical embodiments, depending upon the environment and requirements of use, substantial numbers of the herein shown and described embodiments have been made, tested and used, and all have performed in an eminently satisfactory manner.

Referring now to FIGS. 1 and 2 of the drawing, a light source embodying the present invention is generally designated by the reference numeral 11 and comprises an elongated tubular lamp 12. A reflector 13 which is also of elongated configuration is disposed parallel to and behind the lamp 12, partially enclosing the lamp 12. The reflector 13 has a curved cross section and faces a transparent document carrier or platen 14 on which an original document 16 is placed face down. Due to the shape of the reflector 13, the light from the lamp 12 is formed into a narrow elongated beam which illuminates a portion of the document 16 through the platen 14 in an area indicated by the reference numeral 17. It will be understood that the lamp 12, reflector 13 and light beam extend perpendicular to the plane of FIG. 1.

In operation, the platen 14 and document 16 are moved rightwardly as indicated by an arrow 18 so that the document 16 is progressively illuminated from, for example, top to bottom. Whereas the light source 11 is incorporated in an electrostatic copying machine, an optical system comprising lenses, mirrors, optical fibers or the like focusses an image of the illuminated portion of the document 16 onto a rotating photoconductive drum or belt which has a peripheral surface moving at the same speed as the document 16, although not shown. This forms an electrostatic image on the drum which is developed and transferred to a copy sheet to form a permanent reproduction of the document 16.

The reflector 13 comprises two sections 13a and 13b having different elliptical cross sections. Preferably, both of sections 13a and 13b have focii coincident with a filament 12a of the lamp 12. The other focii of the sections 13a and 13b substantially coincide with the beam on the document 16 at the area 17. Whereas the sections 13a and 13b may be formed separately and assembled, the reflector 13 is preferably formed as in integral unit to facilitate positioning of the lamp 12 relative thereto. It is to be understood that although a reflector 13 with an elliptical cross section is herein shown and described, the present invention is not limited to such a configuration.

As discussed hereinabove, the lamp 12 must be quite powerful in order to provide enough illumination to expose the photoconductive drum. With continuous operation, there is a serious danger of the lamp 12 overheating and causing damage to itself and the other components of the copying machine such as cracking of the platen 14. For this reason, it is necessary to provide an air flow around the lamp 12 to cool the same through convection.

To achieve this object, the present invention provides a duct 19 having an opening 19a at the right end thereof. The reflector 13 is conveniently mounted on the duct 19 for support thereby, and the opening 19a is aligned with an elongated orifice 21 formed through the rear portion or back of the reflector 13. As can be understood from examination of FIG. 2, the orifice 21 extends perpendicular to the plane of FIG. 1.

A blower 22 is mounted in the duct 19 and driven for rotation as indicated by an arrow 23 to cause air to flow through the duct 19, opening 19a, orifice 21 and around the lamp 12 thereby cooling the same. As one alternative, the blower 22 may cause the air to flow from the duct 19 through the orifice 21 to the lamp 12. As another alternative, the blower 22 may cause the air to flow in the opposite direction, or from the area around the lamp 12 through the orifice 21 into the duct 19. The second alternative is somewhat preferable since hot air is prevented from being blown against the platen 14 which may cause the same to crack, although the first alternative may be more suited to certain applications.

Since the orifice 21 is formed through the back of the reflector 13, there is no obstruction of the light beam radiated onto the document 16. As indicated by various ray paths (no reference numerals) in the drawing, light incident on the rear portion of the reflector 13 is reflected back to the lamp 12 rather than to the document 16. In other words, the portion of the reflector 13 through which the orifice 21 is formed does not contribute to the illumination of the document 16. However, the air flow through the orifice 21 cools the lamp 12 with very high effectiveness. It will be further noted that the single duct 19 for the blower 22 is quite simple in construction and may be produced at low cost on a commercial production basis.

As shown in FIG. 3, a modified reflector 31 is formed with a row of round or circular orifices which are collectively designated as 32 through the back thereof. As the row of orifices 32 extends parallel to the lamp 12, the effect is essentially similar to that provided by the single orifice 21.

FIG. 4 shows another reflector 41 formed with two rows of round orifices which are collectively designated as 42. All of the reflectors 13, 31 and 41 are suitable for various applications. The choice of the reflector 13, 31 or 41 is determined by the particular air flow pattern, flow rate, and other practical variables in the required installation.

In summary, it will be seen that the present invention provides a unique and improved scanning light source comprising means for effectively cooling a lamp thereof which does not obstruct the light beam radiated from the light source or introduce a complex ducting arrangement into the construction. Various modifications are possible for those skilled in the art with in the scope of the present invention. For example, although not shown, a temperature sensor may be provided to the lamp 12 or platen 16 to turn on the blower 22 only when the sensed temperature exceeds a predetermined value, thereby conserving electricity.

What is claimed is:

1. A light source for radiating a narrow elongated beam of light onto a document carrier which is movable perpendicular to the beam, comprising in combination:
   an elongated lamp;
   an elongated reflector operatively disposed parallel to and behind the lamp for reflecting light therefrom onto the document carrier thereby forming the beam, the reflector being formed with orifice means through a rear portion thereof;
   a blower disposed behind the reflector for causing air to flow through the orifice means and around the lamp; and
   a duct communicating with the orifice means, the blower being disposed in the duct.

2. A light source as in claim 1, in which the blower causes air to flow from the duct through the orifice means.

3. A light source as in claim 1, in which the blower causes air to flow through the orifice means into the duct.

4. A light source as in claim 1, in which the reflector has an elliptical cross section with a focus coincident with the lamp.

5. A light source as in claim 1, in which the orifice means is formed so as to constitute an elongated orifice extending parallel to the lamp.

6. A light source as in claim 1, in which the orifice means is formed so as to constitute a row of round orifices extending parallel to the lamp.

7. A light source as in claim 1, in which the orifice means is formed so as to constitute a plurality of rows of round orifices extending parallel to the lamp.

8. A light source as in claim 1, in which the reflector comprises two sections having different elliptical cross sections, each section having a focus coincident with the lamp.

9. A light source for radiating a narrow elongated beam of light onto a document carrier which is movable perpendicular to the beam, comprising in combination:
   an elongated lamp;
   an elongated reflector operatively disposed parallel to and behind the lamp for reflecting light therefrom onto the document carrier thereby forming the beam;
   orifice means formed through a rear portion of the reflector and located such that the orifice means does not obstruct the light beam reflected onto the document carrier,
   a duct communicating with the orifice means, said reflector being mounted on the duct, and
   a blower disposed in the duct for causing air to flow through the orifice means and between the lamp.

* * * * *